United States Patent

[11] 3,597,781

[72] Inventors Carl B. H. Eibes, deceased
11 Dr. Carl-Eibes Str., late of
Schnaittenbach;
Christian Eibes, 11 Dr. Carl-Eibes Str.;
Carl-Herwig Eibes, 30, Berlin-Schoneberg;
Maria-Theresia Wagner, nee Eibes, heirs,
Hans Klopferweg Nr. 1 Amberg, all of
Schnaittenbach, Germany
[21] Appl No 733,562
[22] Filed May 31, 1968
[45] Patented Aug. 10, 1971
[32] Priority June 5, 1967
[33] Germany
[31] K 62 476

[54] SELF-TAPPING THREADED BUSHINGS
6 Claims, 11 Drawing Figs.
[52] U.S. Cl........................................ 10/10,
10/27, 10/86, 10/152, 85/48, 151/22
[51] Int. Cl.................................... B21k 1/44,
B23g 9/00, B23g 7/00, B21h 3/02
[50] Field of Search................................ 10/10, 27,
27 P.H., 152, 86 A, 153; 85/47, 48, 46; 151/21 C,
22

[56] References Cited
UNITED STATES PATENTS
| 3,209,383 | 10/1965 | Carlson | 85/47 |
| 3,451,181 | 6/1969 | Neuchotz | 10/27 |
| 3,523,565 | 8/1970 | Olsen | 151/22 |
| 3,530,760 | 9/1970 | Lindstrand | 85/48 |
| 3,504,722 | 4/1970 | Breed | 151/22 |

FOREIGN PATENTS
| 251,425 | 5/1963 | Australia | 85/47 |
| 439,636 | 9/1948 | Italy | 85/47 |

Primary Examiner—Richard J. Herbst
Assistant Examiner—E. M. Combs
Attorney—Hall, Pollock and Vande Sande ABSTRACT: The disclosure relates to a threaded bushing which, upon entering and turning in the initially smooth bore of the work piece, will form through its own male thread the corresponding internal thread within the wall of the work piece bore. The bushing is formed with one or more exterior bevels or grooves which extend axially over at least several threads and intersect such threads to form blade or cup-shaped frontal areas where each bevel or groove merges into a respective thread.

Patented Aug. 10, 1971
3,597,781
5 Sheets-Sheet 1
FIG. 1 FIG. 2
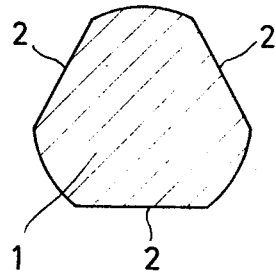
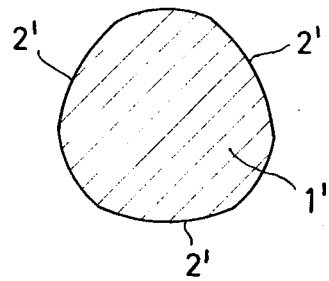
FIG. 3
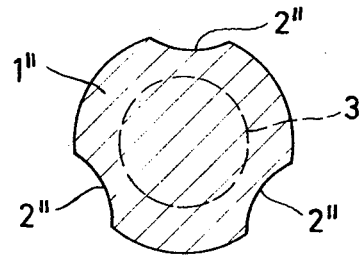
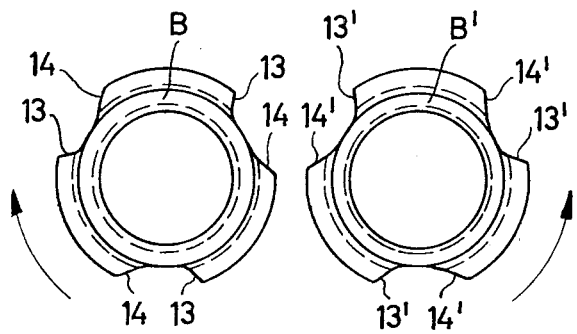
FIG. 4  FIG. 5
Carl B. H. Eibes, Deceased
by Ursula Eibes, geb. Waschau
Christian Eibes
Maria-Theresia, geb Eibes
Carl-Herwig Eibes, heirs
INVENTOR.
BY
Hall, Pollack & Vande Sande Patented Aug. 10, 1971 3,597,781

Carl B. H. Eibes, Deceased
by Ursula Eibes, geb. Waschau
Christian Eibes
Carl-Herwig Eibes
Maria-Theresia, geb.
Eibes, heirs

INVENTOR.

BY

Carl B. H. Eibes, Deceased
by Ursula Eibes, geb. Waschau
Christian Eibes
Carl-Herwig Eibes
Maria-Theresia, geb. Eibes, heirs
INVENTOR.

BY

Hall, Pollack & Vande Sande

Carl B.H. Eibes Deceased
by Ursula Eibes, geb. Waschao
Christian Eibes
Carl-Herwig Eibes
Maria Theresia, geb.
Eibes, heirs
INVENTOR.

BY

Hall, Pollack + Vande Sande

SELF-TAPPING THREADED BUSHINGS

BACKGROUND OF THE INVENTION

Threaded bushings possessing a self-tapping male thread are usually manufactured from metals, such as steel, bronze or brass, and serve to fasten screws, bolts and similar connecting elements within or to structural members or workpieces which have a lesser hardness than the bushing material and can consist for example of soft steel or iron, wood, plastics, light metals and the like. It is the purpose of such threaded bushings, also called liners, to create within a relatively soft workpiece an internal thread possessing relatively great strength. This strength is attained not only by this thread of substantially greater diameter relative to the internal thread diameter of the bushing but also by avoidance of a severance of the fibers of the material, and it is one of the purposes of the invention to avoid this disadvantage.

The invention is designed to solve several problems:
1. The internal thread, produced within the bore of the workpiece, is to be produced partially without cutting; for example by notching, and partially by cutting, i.e. by metal removal;
2. The entering torque of the threaded bushing is to be kept relatively low, while the return torque should be relatively high.
3. The costs for manufacturing the threaded bushing should be as low as possible.

Self-tapping threaded bushings of various types and designs are known. For example, there exist threaded bushings which provide, at least over a portion of the length of the bushing, grooves or slots which run substantially parallel to its axis and which form cutting edges together with the webs of the thread, and with the outside of the penetrating end of the bushing usually designed conically. These slots or grooves of the known threaded bushings are usually produced, following the manufacture of the male thread of the bushing, by milling, grinding or the like. This method of manufacture is very costly. Furthermore, threaded bushings of this type will produce the internal thread within the bore of the workpiece almost exclusively by cutting. The forming of the thread by cutting in the manner described has the disadvantage that the fibers of the workpiece material are severed, thereby lowering its stability and especially its shearing strength.

SUMMARY OF THE INVENTION

In order to solve the above-discussed problems, the invention is based on a threaded bushing possessing bevels, grooves, or the like which intersect the male thread and form recesses within the originally round contour, and which extend axially at least over several threads but preferably over the total axial length of the threaded bushing, and whereby between the bevel, groove, or the like on the one hand and the threads on the other hand (i.e. at the webs of the thread,) faces or frontal areas are created which will produce female threads within the bore of the work piece, the novel and inventive feature being that the frontal areas of each thread are bent or curved up, relative to the original contour, and are formed concavely, similar to a shovel or spoon.

Particularly significant in connection with the threaded bushing proposed by the invention is the point that the frontal areas of the thread, facing each other from both sides of a bevel, are bent or curved up at dissimilar magnitudes relative to the original contour, and that they are designed in the shape of a shovel or spoon.

Another specific characteristic, significant in connection with the invention, of these frontal areas is the fact that they possess edges which are designed in the form of not too sharply edged cutting edges, or edges which will help to increase the restoring moment. These frontal areas are produced by a male thread-rolling process and appropriate deformation of material, that is they are formed by raising from the original surface or contour of the bevel or the like.

According to the invention, this is accomplished by furnishing a profile bar, which has several bevels distributed across its contour (the bevels preferably being axially parallel,) with a male thread by means of rolling tools, whereby the characteristics of the rolling process, such as rolling pressure, rolling depth, rolling advance, shape and material of the rolling tool, and the like, are set and selected in such manner that the frontal area, created in the zone of transition between an individual web of the thread and an individual bevel, is curved at the thread end to a greater or lesser degree relative to the original plane or contour of the bevel, or is raised due to the deformation of material, and that the edges of said frontal areas project above the areas with the edges not too sharply edged. The not too sharply edged design is a decisive feature for the creation of a powerful restoring moment, but it leads also the other desired effect, namely that upon entering and turning of the bushing the internal thread of the workpiece is being formed only partially by cutting but mainly by deformation without cutting Preferred basic material to be utilized is profile material, for example bars or tubes, produced by drawing. Such profile material will already possess bevels in flat, convex or concave form.

The invention proposes further that during or after the rolling of the male thread, there are produced in a manner known per se, adjacent to one or both ends of the threaded bushing, conically beveled male thread profiles, their outer diameters tapering off toward the ends. By making the threaded bushing pointed at both ends, the invention makes it feasible to select one or the other end of a threaded bushing to be entered and turned in the smooth bore of a workpiece, or to fasten it within the workpiece, utilizing the greater or lesser curved frontal area as cutting surface, or the lesser or greater curved frontal area as means to increase the restoring torque.

The direction of rolling at the creation of the male thread of the bushing and the direction of turning of the bushing into the workpiece will either coincide or be opposite to each other, and accordingly the more heavily curved frontal area will act as thread-forming means, and the lesser curved frontal area as means to increase the restoring torque, or vice versa.

The invention proposes further that the boring of the threaded bushing and the furnishing of the female thread is accomplished in a manner known per se either before or after the thread-rolling.

If applicable, it is further proposed that in case of a threaded bushing made of steel the male thread or the entire bushing is tempered after the thread-rolling.

It has been found that such concave or cup-shaped designs of the frontal areas which are curved or drawn up relative to the bevel, groove or the like possess edges which have, or can perform, at least partially the function of cutting and also simultaneously of displacing material if these frontal areas are utilized as internal thread-generating means.

At each bevel, groove, or the like, each individual web of a thread possesses two frontal areas, and according to the invention the second area formed in the direction of rolling has a lesser pitch than the frontal area designed for cutting, but even the latter is still kept sufficiently concave or cup-shaped in order to attain a restoring torque which is greatly improved over the designs known heretofore. It is also possible, under special circumstances, to interchange the functions of the two frontal areas so that the flatter area will act as thread-forming means when entering and turning in the threaded bushing, with the more pronouncedly curved frontal area increasing the exit torque during return movement.

Manufacture is accomplished by process covered by the invention, preferably by thread-rolling. It was found unexpectedly and surprisingly that in case of basic material possessing the bevels or grooves at full length, and proper selection of the rolling surface pressure as well as the other characteristics of the rolling process, there are created by the thread-rolling curved frontal areas at the webs of the thread, that is within the zone of transition between the web of the thread and the bevel or groove, a significant feature being that through such rolling process, correctly set and controlled, said raised edges of the frontal area are produced. The direction of rolling should correspond to the direction of turning in of the bushing if it is desired to use the steeper or more pronouncedly curved thread-forming element (the frontal areas) for the creation of the internal thread within the smooth bore of the workpiece; if it is desired, in case of special circumstances, to employ the lesser curved frontal areas as the thread-forming areas, the opposite rolling direction will be chosen. As already mentioned, in the latter case the restoring moment is thus increased still further.

The ratio between the internal thread forming by cutting and by shaping without cutting will vary, depending for example on the steepness or height of the frontal area curvature, the sharpness of the edges of the frontal area, and other characteristics. In any event, the invention will have the effect of attaining a sufficient deformation of material without cutting, following, timewise, the cutting phase of the thread-forming process, so that compacting of the material as well as an improvement in the fiber structure of the material of the workpiece can be attained. Such deformation of the material has the additional advantage that the inserted threaded bushing will be seated more strongly and securely in the workpiece.

If the edges of the frontal areas are not especially sharp, as can be definitely accomplished by means of a properly controlled rolling process, any danger of separating the fibers of the workpiece material will be eliminated.

BRIEF DESCRIPTION OF THE DRAWINGS

Specifically, the drawings illustrate in:

FIG. 1 illustrates the profile of a solid rod with three uniformly spaced bevels in longitudinal direction;

FIG. 2 illustrates a solid rod in profile with slightly convex bevels running in a longitudinal direction;

FIG. 3 shows a solid rod in profile with three uniformly spaced, slightly concave bevels running in longitudinal direction;

FIG. 4 is a plan view of a completed threaded bushing;

FIG. 5 is a plan view of another species of a completed bushing;

DETAILED DESCRIPTION OF THE ILLUSTRATED EMBODIMENTS

Figure 6:
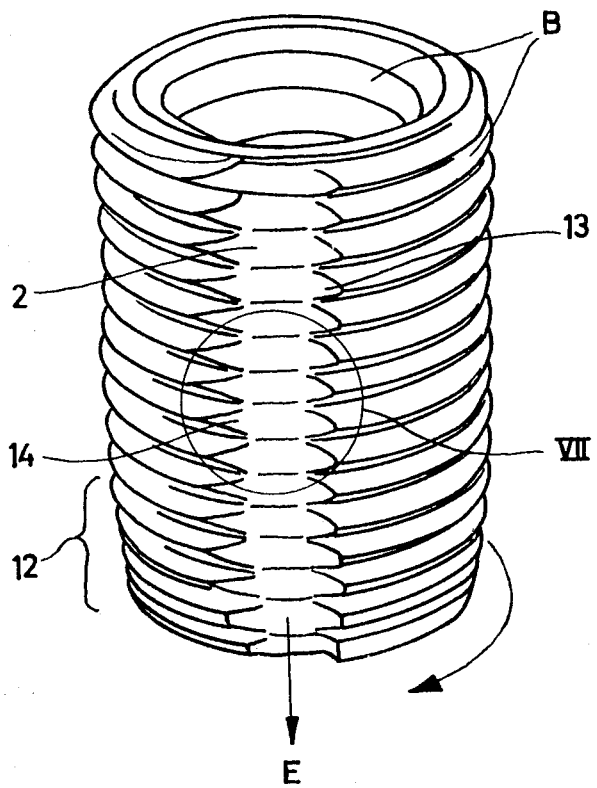
FIG. 6 is a completed threaded bushing in perspective.

FIG. 1 shows rod 1, originally a round bar, provided with flat bevels 2, spaced uniformly at the contour and running axially parallel, that is in a longitudinal direction of the rod.

FIG. 2 shows a substantially identical rod 1', its bevels 2' shaped slightly in convex form, but otherwise identical with bevels 2.

In FIG. 3 the bevels 2'' are shaped concavely at the otherwise identical rod 1'', running again in longitudinal direction, axially parallel. At area 3 it is indicated that the rod can be hollowed, whereby the inner wall 3 can be provided with the required internal thread at the proper stage of the manufacturing process. Usually, solid rods will be preferable in view of the rolling process because there exists the danger that a thin-walled tube could be deformed excessively due to the rolling pressure.

FIG. 4 shows a completed threaded bushing B in plan view, where the direction of turning is identical with the direction of rolling, both running in clockwise direction. The rolling direction illustrated, creating the male thread, causes the above-discussed bulging, that is the formation of curved-up or bent-up cutting edges 13, created by clockwise displacement of material. The rolling process also has the peculiar consequence that there will rise in the other direction, that is opposite to the rolling direction, a less pronounced curvature at 14, which in this case represents the restoring edge 11.

In case of the threaded bushing B', shown in FIG. 5 in the form of an axial view, the rolling had been performed in opposite direction, and this figure illustrates that the position of the edges or frontal areas 13 and 14 becomes reversed, the areas being designated by numerals 13' and 14'

FIG. 6 shows the tapering of the lower threads within area 12, a feature which is known per se and which can be accomplished for example by proper turning or grinding.

We wish to mention that the preferred basic material is a rod, manufactured by drawing and formed as shown in FIGS. 1—3 A significant feature of the invention is the fact that the frontal areas 13 as well as the opposite areas 14, created at the webs of the thread at the zone of transition toward the bevel 2 or the like, have a concave shape, similar to a spoon, for example, an internal surface in the form of a spade or scoop; in other words, areas are curved inwards spherically and cuplike.

Figure 7:
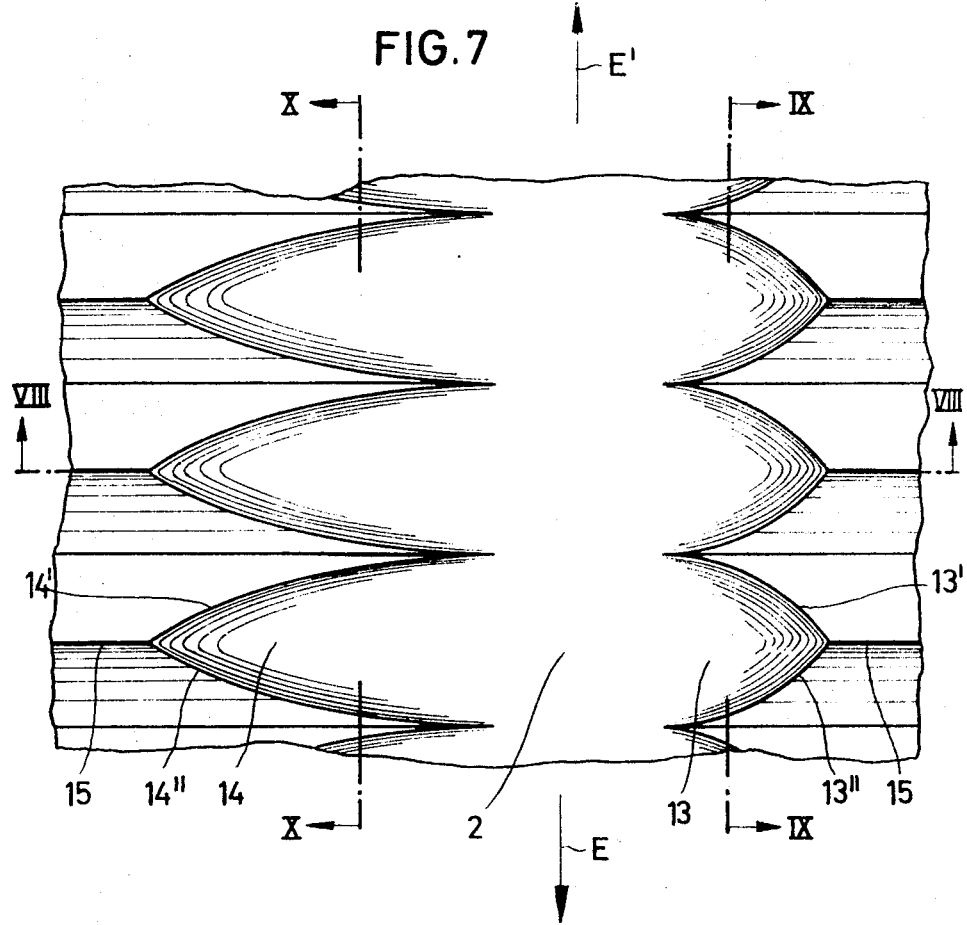
FIG. 7 is an enlargement of the area VII depicted in FIG. 6.
Figure 8:
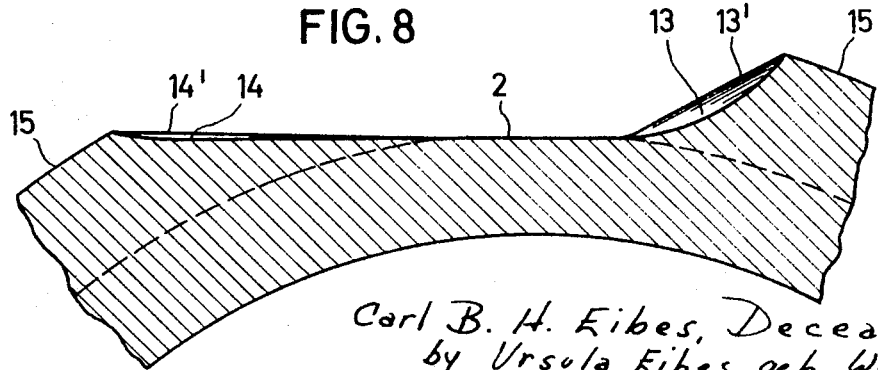
FIG. 8 is a section along line VIII-VIII of FIG. 7.

FIGS 7 and 8 illustrate this point in a particularly clear manner. The frontal areas 13 possess a spherical concavity of the frontal edge or area of the web 15 of the thread. The frontal areas 14 are shaped in the same manner although less pronouncedly. The edges 13' and 13'' of said frontal areas 13 are upwardly forced, narrow webs which act in a certain manner as cutting edges, that is metal-removing edges; however, since they do not possess the sharpness of a knife they will fulfill the desired effect of not only removing metal by cutting but to begin, and at least carry out partially, the process of deforming material during the formation of the female thread within the workpiece. Likewise, the edges or rims 14' and 14'' of the frontal areas 14 will form not too sharp cutting edges, so that these frontal areas 14 will increase significantly the restoring moment during the back-out, assuming that the direction of entry and turning corresponds to the arrow E in FIG. 7. Obviously, in case of the opposite direction of turning, as indicated by arrow E', the frontal area 14 will be the area forming the female thread, and areas 13 the back-out areas, causing a particularly great increase in the restoring moment.

Figure 9:
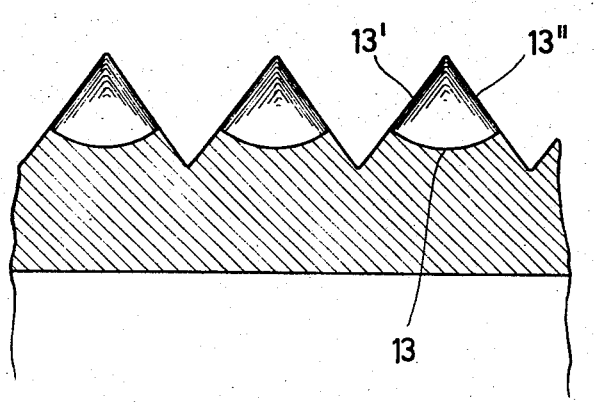
FIG. 9 is a section along line IX-IX of FIG. 7.
Figure 10:
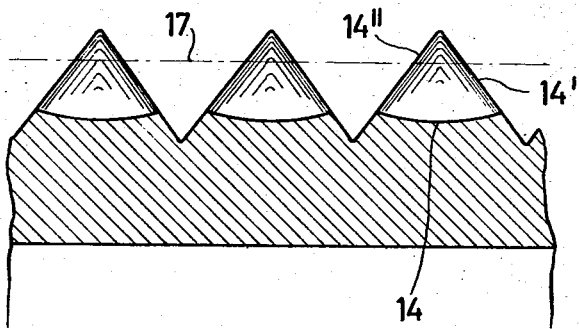
FIG. 10 is a section along line X-X of FIG. 7.

FIGS. 9 and 10 illustrate the sectional views along the lines depicted in FIG. 7. It should be noted that within the lower region 12 (see FIG. 6), the webs of the thread are flattened, that is designed in tapered shape, as indicated by the broken line 17 in FIG. 10 (not shown in FIG. 9).

Figure 11:
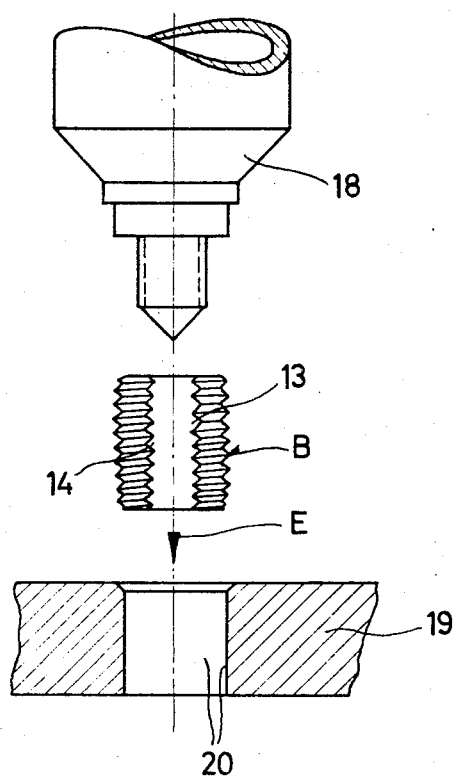
FIG. 11 illustrates the insertion and turning process of a bushing into a workpiece.

FIG. 11 shows how a threaded bushing B is introduced and turned in workpiece 19 in direction E by a turning tool 18 of known construction, the workpiece possessing a known smooth bore 20, the bore diameter being smaller than the widest part of the outer diameter of bushing B. The bushing B, illustrated in FIG. 11, has for example the thread-forming frontal areas 13 and the back-out areas 14, as shown in FIG. 6

Also covered by the invention is the manufacture of threaded bushings possessing one or more of the above-discussed features in that manner that first pieces of bushing length are cut off from a rod or tube section possessing a round contour, the pieces are then provided with bevels (2, 2') and with a male thread by rolling, the internal thread being created in usual manner Finally, another manufacturing process within the framework of the invention could utilize pressure die casting with the pressure die casting tools or molds being shaped and designed in such manner that the above-discussed physical features, in particular the scoop-shaped form of the frontal areas 13, 14, will be created Having described an improved self-tapping bushing as one improvement of this invention, we desire it to be understood that various other modifications and alterations may be made to the specific forms shown without departing from the scope of the invention.

What I claim is:

1. A process for the manufacture of threaded self-tapping bushings comprising, forming on the exterior of a generally cylindrical bushing member at least one axially extending groove which extends over at least a part of the length of said bushing member, rolling a male thread by means of rolling tools onto the exterior of said bushing member, in said thread rolling step deforming the crest of each said male thread at its intersection with each said bevel both along the circumferential direction of said thread and transversely thereto along the axial direction of the bushing to form spoon-shaped frontal areas having upstanding edges which deform the thread of the workpiece into which said bushing is turned.

2. The process of claim 1 wherein the axially extending grooves are formed on the bushing member by drawing.

3. The process according to claim 1 in which the direction of thread rolling corresponds to the direction of turning of the threaded bushing into the workpiece.

4. The process of claim 1 in which the direction of thread rolling is opposite to the direction of turning of the threaded bushing into the workpiece.

5. The process according to claim 1 in which the threaded bushing is made of steel and is tempered after said thread-rolling step.

6. The process according to claim 1 in which the starting material comprises pieces of bushing length cut from stock material of circular cross section.